(12) United States Patent
Toyosawa et al.

(10) Patent No.: US 6,399,696 B1
(45) Date of Patent: Jun. 4, 2002

(54) THERMOPLASTIC ELASTOMER COMPOSITION AND GASKET MATERIAL

(75) Inventors: Shinichi Toyosawa, Saitama-ken; Youichi Nishimuro, Tokyo; Kunio Machida, Tokyo; Takashi Shimizu, Tokyo; Naruhiko Mashita, Kanagawa-ken; Yasunori Fukuda, Kanagawa-ken; Jun Arai, Kanagawa-ken; Yasushi Imai, Kanagawa-ken; Tadashi Utsunomiya, Kanagawa-ken, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/505,683

(22) Filed: Feb. 17, 2000

(30) Foreign Application Priority Data

| Feb. 25, 1999 | (JP) | ............................................. | 11-048401 |
| Feb. 25, 1999 | (JP) | ............................................. | 11-048402 |
| Aug. 27, 1999 | (JP) | ............................................. | 11-241782 |
| Oct. 14, 1999 | (JP) | ............................................. | 11-292343 |
| Oct. 14, 1999 | (JP) | ............................................. | 11-292345 |

(51) Int. Cl.$^7$ ........................... C08L 53/02; C08L 23/12
(52) U.S. Cl. ................... 524/505; 524/474; 524/476; 524/582; 525/95; 525/98
(58) Field of Search ...................... 524/474, 476, 524/481, 505, 483, 582; 525/92 A, 95, 98

(56) References Cited

U.S. PATENT DOCUMENTS

| 4,361,507 A | * | 11/1982 | Bourland | .................... | 524/505 |
| 4,361,508 A | * | 11/1982 | Bourland | .................... | 524/505 |
| 4,772,657 A |   | 9/1988  | Akiyama et al. | ........... | 524/474 |
| 5,187,224 A | * | 2/1993  | Hamanaka et al. | ......... | 524/505 |
| 5,216,074 A | * | 6/1993  | Imai et al. | .................... | 524/505 |
| 5,777,031 A | * | 7/1998  | Djiauw et al. | ................ | 525/98  |

FOREIGN PATENT DOCUMENTS

| EP | 0 546 530 | 6/1993 |
| EP | 0 810 262 | 12/1997 |
| EP | 0 837 098 | 4/1998 |
| EP | 0 845 498 | 6/1998 |
| WO | WO 95/27756 | 10/1995 |
| WO | WO 99/42396 | 8/1999 |

OTHER PUBLICATIONS

U.S. Patent Application Publication US 2001/0018490 09/784,415 Aug. 30, 2001.*

* cited by examiner

*Primary Examiner*—Peter Szekely
(74) *Attorney, Agent, or Firm*—Oblon, Spivak, McClelland, Maier & Neustadt, P.C.

(57) ABSTRACT

There are disclosed a thermoplastic elastomer composition which comprises (a) a hydrogenated block copolymer obtained by hydrogenating the block copolymer comprising at least one polymer block composed principally of a vinylic aromatic compound and at least one polymer block composed principally of a conjugated diene compound; (b) a non-aromatic base softening agent having a kinematic viscosity at 40° C. of at least 100 mm$^2$/sec; and (c) propylene homopolymer and/or propylene copolymer comprising propylene as a principal component which is obtained through polymerization by using a metallocene catalyst, which is free from a lubricant, which has been heat treated, or which has a MFR (melt flow rate) in a specific range; a gasket material which comprises the above thermoplastic elastomer composition and is particularly suited for use in hard disc units because of its excellent sealing properties and its capability of preventing gas generation; a method for injection molding the above composition; an external anti-sticking agent for a thermoplastic elastomer or rubber which comprises fine particulates of ultrahigh molecular weight polyethylene having an average particle diameter in a specific range, and which is minimized in hygroscopicity, oil absorptivity and volatility, and has high heat resistance and anti-stickiness; and rubber and/or a thermoplastic elastomer which is incorporated with the above external anti-sticking agent and imparted with anti-stickiness.

7 Claims, 1 Drawing Sheet

F I G. 1

THERMOPLASTIC ELASTOMER COMPOSITION AND GASKET MATERIAL

BACKGROUND OF THE INVENTION

1. Field of the Invention

The present invention relates to a thermoplastic elastomer and a gasket material using the same. More particularly, the present invention pertains to a thermoplastic elastomer and a gasket material using the same that are excellent in sealing properties, prevent the generation of gases such as volatile low molecular components even during a long-term application, and in particular are well suited for use as a member for electronic equipment; to a method for injection molding a thermoplastic elastomer material, and more particularly; to a method for injection molding a thermoplastic elastomer material which is excellent in sealing properties rand sliding properties on the surface of a molding, prevents the generation of gases such as volatile low molecular components even during a long-term application, and particularly, is well suited for use as a member for precision equipment. The present invention further relates to an external anti-sticking agent for rubber or thermoplastic elastomers which is used for adding to the surfaces of products, moldings or pellets comprising rubber or a thermoplastic elastomer, and to rubber or a thermoplastic elastomer which is incorporated with said anti-sticking agent and is excellent in anti-sticking properties.

2. Description of the Related Arts

The development of electronic equipment in recent years really amazes the persons concerned. The aforesaid equipment, which is subjected to printed circuit on a substrate by the use of integrated circuits utilizing semiconductors, is directed to compactified lightweight equipment, and is prone to be readily damaged by moisture or dampness in particular. Accordingly, the hermetically sealing performance of a gasket is a factor of importance for the performance and durability of the electronic equipment, which gasket is used for hermetically sealing the joint surface between a cover body and a box type main body having built-in integrated circuits mentioned above.

It is customary for the purpose of hermetical sealing to integrate a cover body and a box type main body having built-in integrated circuits into equipment by interposing a gasket which hermetically seals the joint surface between said both the bodies and tightening them with fixing bolts. There has heretofore been used a high density urethane foam material as a gasket material. The urethane foam material is foamed urethane cut into thin sheet foam, and is used in many cases by sticking an adhesive tape on the urethane sheet foam and punching the sheet foam into a prescribed shape. In addition, there is proposed a method for injection molding an elastomer after a frame body composed of stainless steel or a synthetic resin is inserted into a mold {refer to Japanese Patent Application Laid-Open No. 283698/1996 (Heisei-8)}.

However, most of both the gasket composed of urethane foam material and the gasket composed of an elastomer generate gases that contaminate a magnetic disc, when practical use of the main body of electronic equipment raises the temperature therein to 40 to 50° C. The gases thus generated are often accumulated on the disc of a hard disc apparatus and the like, thereby making it impossible to read out on the hard disc apparatus.

As a countermeasure for eliminating the above mentioned disadvantages, there is provided a mechanism of adsorbing the gases thus generated {refer to Japanese Patent Application Laid-Open No. 302178/1994 (Heisei-6)},and there is provided a gas adsorbent in breathing holes that are made in the main body of electronic equipment to cope with the infiltration from the outside, of gases that contaminate magnetic discs {refer to Japanese Patent Application Laid-Open No. 36548/1994 (Heisei-6)}.

Nevertheless even with the use of the above mentioned provisions, it has been impossible to avoid the disadvantages that the use of electronic equipment is always accompanied by the generation of gases.

The gasket which is interposed between a box type main body having built-in integrated circuits and a cover body at the joint surface therebetween is usually in the form of a gasket which is fitted to a cover body and thus fixed to the cover. It is customary, for instance, to make holes in the cover body and fix a gasket material from both sides of the cover body through the holes. In this case, since the gasket material is exposed on the upper side of the cover body, the gasket material exposed thereon is sometimes upturned or curled when the cover body is inserted into an electronic equipment space which is narrowed accompanying the recent compactification of electronic equipment part items, or when the gasket is brought into contact with an external member at the time of handling work. Thus, there is caused the problem that such upturning or curling is responsible for defective sealing properties. As a countermeasure thereagainst, an attempt is made to improve sliding properties on the surface of a molding by blending silicone polymer in a thermoplastic material. However, also in this case there is caused such disadvantage that low molecular components in the silicone polymer volatilize and thus exert adverse influence upon peripheral precision members.

On the one hand, there is known that use is made of inorganic fine powders such as calcium carbonate and talc and organic fine powders such as polytetrafluoroethylene, polystyrene and polyethylene as dusting powders for preventing the agglomeration of pellets in the case of injection molding by the use of a thermoplastic elastomer material in the form of pellet. However, the conventionally used powders of these types contain impurities in its production step or halogen components or low molecular components due to the adsorption of various volatile pollutants. Accordingly, there is a suspicion that the aforesaid components are discharged in working environments after being processed into moldings, thereby exerting adverse influence upon the performance of precision equipment. In particular, there is caused a practically serious problem in the case where the moldings are employed as gasket materials for a hard disc apparatus.

Since conventional dusting powders are incorporated into thermoplastic elastomer materials after the molding step so as to be present almost uniformly, the surfaces of the moldings reveal the tackiness and stickiness inherent in the original thermoplastic elastomer. Thus in the case of a structure in which molded materials are exposed on the front side (for instance, gasket materials for hard disc apparatus in the form of fit type), the problem remains unsolved in that the gasket materials are upturned, curled or pulled.

There has heretofore been taken the countermeasure for preventing objects of anti-stickiness from sticking to one another by applying coating of an anti-sticking agent to the surfaces of the objects of anti-stickiness such as products, moldings or pellets each composed of rubber or thermoplastic elastomers. There have heretofore been used, as an external anti-sticking agent, inorganic substances containing natural products such as calcium carbonate, talc, magnesium carbonate and mica, and silicones such as silicone oil and silicone polymer.

Nevertheless, because of their high hygroscopicity and oil adsorptivity the inorganic substances containing natural products, when being applied to a product or the like which is composed of rubber or a thermoplastic elastomer and which is the object to be imparted with anti-stickiness, adsorb low molecular components such as oils blended in said product, thereby making it impossible to use the product or the like for a long period of time. On the other hand, it is concerned that silicone, which is costly and most possibly volatilizes and causes electrically defective contact, will raise problems in the case of fabricating optical part items or precision part items by the use of rubber or a thermoplastic elastomer which is externally incorporated with silicone.

SUMMARY OF THE INVENTION

Under such circumstances, it is a general object of the present invention to provide a thermoplastic elastomer composition which is excellent in sealing properties and prevents the generation of gases such as volatile low molecular components.

It is another object of the present invention to provide a gasket material which can solve the foregoing problems, when used in particular as a member for electronic equipment, especially a gasket material for a hard disc apparatus.

It is still another object of the present invention to prevent the foregoing upturning phenomenon of gasket materials and the like by enhancing the sliding properties of the surfaces of injection molded articles, and also to provide a process for injection molding a thermoplastic elastomer material to be used for producing moldings wherein volatile components which contaminate precision equipment members are minimized.

It is a further object of the present invention to provide an external anti-sticking agent which is minimized in hygroscopicity, volatility and oil adsorptivity, and which is capable of imparting stable anti-sticking performance to the objects of anti-stickiness such as a product composed of rubber or a thermoplastic elastomer.

In view of the foregoing, intensive extensive research and investigation were accumulated by the present inventors in order to achieve the above mentioned objects. As a result, it has been found that the general object can been achieved by using a specific thermoplastic elastomer composition, that another object can been achieved by using specific powders as dusting powders for pellet at the time of injection molding, and that the further object can been achieved by coating the surface of the object of anti-stickiness such as a product, molding, pellet or the like with fine particulates of ultra-high molecular weight polyethylene.

It being so, the present invention has been accomplished on the basis of the above mentioned findings and information.

Specifically, the present invention provides a thermoplastic elastomer composition (I) which comprises 100 parts by weight of (a) a hydrogenated block copolymer obtained by hydrogenating the block copolymer comprising at least one polymer block composed principally of a vinylic aromatic compound and at least one polymer block composed principally of a conjugated diene compound; 50 to 1000 parts by weight of (b) a non-aromatic base softening agent having a kinematic viscosity at 40° C. of at least 100 mm$^2$/sec; and 1 to 100 parts by weight of (c1) propylene homopolymer and/or propylene copolymer comprising propylene as a principal component each being obtained through polymerization by using a metallocene catalyst.

The present invention also provides a thermoplastic elastomer composition (II) which comprises 100 parts by weight of (a) a hydrogenated block copolymer obtained by hydrogenating a block copolymer comprising at least one polymer block composed principally of a vinyl aromatic compound and at least one polymer block composed principally of a conjugated diene compound; 50 to 1000 parts by weight of (b) a non-aromatic base softening agent having a kinematic viscosity at 40° C. of at least 100 mm$^2$/sec; and 1 to 100 parts by weight of (c2) propylene homopolymer and/or propylene copolymer comprising propylene as a principal component each free from a lubricant.

The present invention further provides a thermoplastic elastomer composition (III) which comprises 100 parts by weight of (a) a hydrogenated block copolymer obtained by hydrogenating a block copolymer comprising at least one polymer block composed principally of a vinyl aromatic and at least one polymer block composed principally of a conjugated diene compound; 50 to 1000 parts by weight of (b) a non-aromatic base softening agent having a kinematic viscosity at 40° C. of at least 100 mm$^2$/sec; and 1 to 100 parts by weight of (c3) propylene homopolymer and/or propylene copolymer comprising propylene as a principal component each having been heat treated.

The present invention still further provides a thermoplastic elastomer composition (IV) which comprises 100 parts by weight of (a) a hydrogenated block copolymer obtained by hydrogenating a block copolymer comprising at least one polymer block composed principally of a vinyl aromatic compound and at least one polymer block composed principally of a conjugated diene compound; 50 to 1000 parts by weight of (b) a non-aromatic base softening agent having a kinematic viscosity at 40° C. of at least 100 mm$^2$/sec; and 1 to 100 parts by weight of (c4) propylene homopolymer and/or propylene copolymer comprising propylene as a principal component each having an MFR (melt flow rate) at a temperature of 230° C. at a load of 2.16 kgf (21.2 N) being at most 20 g/10 minutes as measured in accordance with JIS (Japanese Industrial Standard) K7210.

The present invention furthermore provides a gasket material, particularly a gasket material for hard disc apparatuses which comprises any one of the thermoplastic elastomer compositions (I), (II), (III) and (IV).

Moreover, the present invention provides a process for injection molding a thermoplastic elastomer material in the form of pellet which comprises using fine particulates of ultrahigh molecular weight polyethylene as dusting powders for preventing agglomeration of the pellet at the time of injection molding.

In addition to the foregoing, the present invention provides an external anti-sticking agent which comprises fine particulates of ultrahigh molecular weight polyethylene having an average particle diameter of 500 μm or smaller, and which is used for rubber or a thermoplastic elastomer; and rubber or a thermoplastic elastomer which is imparted with excellent anti-stickiness by being incorporated with the aforesaid anti-sticking agent.

DESCRIPTION OF THE PREFERRED EMBODIMENTS

As the component (a) in the thermoplastic elastomer composition (I), (II), (III) or (IV), there is used a hydrogenated block copolymer obtained by hydrogenating the block copolymer which comprises at least one polymer block composed principally of a vinylic aromatic compound and at least one polymer block composed principally of a conjugated diene compound.

More specific examples of the aforesaid hydrogenated block copolymer include:

① Block copolymer of crystalline polyethylene and ethylene/butylene styrene random copolymer, said block copolymer being obtained by hydrogenating block copolymer of polybutadiene and butadiene-styrene random copolymer; and ② Block copolymer of polybutadiene and polystyrene, block copolymer of polyisoprene and polystyrene, diblock copolymer of crystalline polyethylene and polystyrene, said diblock copolymer being obtained by hydrogenating block copolymer of polybutadiene or ethylene-butadiene random copolymer and polystyrene, triblock copolymer (SEBS) of styrene-ethylene/butylene-styrene, and triblock copolymer (SEPS) of styrene-ethylene/propylene-styrene, in particular, block copolymer of styrene-ethylene/butylene-styrene, and block copolymer of styrene-ethylene/propylene-styrene. Any one of the above-exemplified thermoplastic elastomers may be used alone or in combination with at least one other elastomer mentioned above.

Preferably, these hydrogenated block copolymers have each a number-average molecular weight of at least 60,000. A number-average molecular weight thereof, when being less than 60,000, often gives rise to such disadvantages as increase in the bleeding of the softening agents and increase in its compression set, which result in failure to withstand the practical service. There is no specific upper limit imposed on the number-average molecular weight thereof, which however is approximately 400,000.

The content of noncrystalline styrene blocks in said hydrogenated block copolymer is in the range of preferably 10 to 70% by weight, more preferably 15 to 60% by weight. The noncrystalline styrene blocks therein have a glass transition temperature of preferably 60° C. or higher, more preferably 80° C. or higher. In addition, noncrystalline styrene blocks are preferable as polymers for linking the noncrystalline styrene blocks at both the ends. The hydrogenated block copolymer is usually used alone, but may be used in combination with at least one other thereof.

For the purpose of lowering the hardness of the thermoplastic elastomer as the component (a) in the thermoplastic elastomer composition (I), (II), (III) or (IV) according to the present invention, it is necessary to blend therein a non-aromatic base softening agent having a kinematic viscosity at 40° C. of at least 100 mm$^2$/sec. A kinematic viscosity at 40° C. thereof, when being lower than 100 mm$^2$/sec, gives rise to such disadvantages as marked weight loss of said composition due to volatilization as well as bleeding, which result in failure to withstand the practical service. Thus, from the viewpoints of practical application and production, said kinematic viscosity at 40° C. is in the range of preferably 100 to 10,000 mm$^2$/sec, more preferably 200 to 5,000 mm$^2$/sec. With regard to molecular weight, the weight-average molecular weight of the softening agent is preferably less than 20,000, more preferably less than 10,000, particularly preferably less than 5,000. The usable softening agent is preferably liquid or in the form of liquid at room temperature, and it may be either hydrophilic or hydrophobic.

The softening agent having such properties can properly be selected from a variety of non-aromatic base softening agent, for instance, mineral oil base, vegetable oil base and synthetic base. Examples of the softening agents of mineral oil base include process oils of naphthene base and paraffin base. Examples of those of vegetable oil base include castor oil, cotton seed oil, linseed oil, rapeseed oil, soybean oil, palm oil, coconut oil, arachis oil, Japan wax oil, pine oil and olive oil. Of these, are preferable an oil and at least two oils each having a weight-average molecular weight in the range of 450 to 5,000, and being selected from among mineral oil-base paraffinic oil, naphthenic oil, and synthetic-base polyisobutylene base oil. Any of these softening agents may be used alone or as a component in the mixture of at least two agents.

The blending amount of any of these softening agents is in the range of usually 50 to 1,000 parts by weight, preferably 55 to 300 parts by weight based on 100 parts by weight of said component (a). A blending amount thereof, when being less than 50 parts by weight based thereon, results in failure to sufficiently lower the hardness, thereby causing insufficient softness or flexibility of the thermoplastic elastomer composition, whereas said amounts when being more than 1,000 parts by weight based thereon, causes the softening agent to become prone to bleed out, and the thermoplastic elastomer composition to be deteriorated in mechanical strength. Moreover, it is preferable that the blending amount of the softening agent be selected at a value in the foregoing range in accordance with the molecular weight of the hydrogenated block copolymer as the component (a) and the types of other components to be added thereto.

For the purpose of contriving the improvement in the processability and heat resistant characteristics of the thermoplastic elastomer composition (I), (II), (III) or (IV) according to the present invention, and also preventing the generation of gases such as volatile low molecular components, it is necessary to blend therein the components (c1), (c2) (c3) and (c4), respectively.

The component (c1) in the thermoplastic elastomer composition (I) according to the present invention is propylene homopolymer and/or propylene copolymer comprising propylene as a principal component each being obtained through polymerization by using a metallocene catalyst. The aforesaid propylene-base polymer is produced by polymerization in the presence of a metallocene catalyst, for instance, a metal complex of a compound containing cyclopentadienyl ring, and has an extremely narrow molecular weight distribution as compared with conventional polypropylene, whereby a volatile low molecular component is hardly contained. Accordingly even in the case where said thermoplastic elastomer composition is employed for a long period of time as a gasket material for a hard disc apparatus, the disc performance is not impaired by volatile components in the form of gas.

No specific restriction is imposed upon said polymer, but Mw/Mw (Mw: weight-average molecular weight/Mn: number-average molecular weight) is usually in the range of 1.5 to 3.5. Preferable examples of said polymer include isotactic polypropylene and the copolymer of propylene and a small amount of an other α-olefin, such as propylene/ethylene copolymer and propylene/4-methyl-1-pentene copolymer. In the case of using the copolymer of isotactic polypropylene as said polymer, there is preferably usable said copolymer having an MFR (JUS K7210) in the range of 0.1 to 100 g/10 minutes, particularly 0.5 to 50 g/10 minutes.

The blending amount of the component (c1) is in the range of usually 1 to 100 parts by weight, preferably 3 to 40 parts by weight, particularly preferably 5 to 30 parts by weight based on 100 parts by weight of the component (a).

A blending amount thereof, when being more than 100 parts by weight based thereon, brings about excessively high hardness of the thermoplastic elastomer composition to be produced, thereby deteriorating the sealing properties.

The component (c2) in the thermoplastic elastomer composition (II) according to the present invention is propylene homopolymer and/or propylene copolymer comprising propylene as a principal component each free from a lubricant. Examples of said propylene polymer include copolymer of propylene and a small amount of an other α-olefin, such as propylene/ethylene copolymer and propylene/4-methyl-1-pentene copolymer.

The polypropylene relating to the thermoplastic elastomer composition (II) is not the polypropylene which has been polymerized by the use of metallocene catalyst, but is conventional polypropylene which is specifically exemplified by isotactic polypropylene and atactic polypropylene and is obtained by polymerizing propylene in the presence of, for instance, Ziegler catalyst (titanium base). A random copolymer among the copolymers is obtained by polymerization in the presence of a small amount of ethylene or an other α-olefin, while block copolymer among them is obtained by producing propylene homopolymer, and then polymerizing ethylene.

The propylene homopolymer and/or propylene copolymer comprising propylene as a principal component (hereinafter referred to as "polypropylene etc.") each free from a lubricant which is a source of gas generation, do not generate a gas even in an environment of 40 to 50° C. Thus, even when a thermoplastic elastomer composition comprising propylene free from a lubricant is used as a gasket material in a hard disc apparatus for a long period of time, the performance of the disc is not impaired by a volatile component in the form of gas.

By the term lubricant as mentioned herein is meant an additive which imparts the "propylene etc." with lubricity needed for facilitating molding processing thereof, and is specifically exemplified by hydrocarbon-base lubricants such as paraffin and wax, fatty acid-base lubricants such as stearic acid, metallic soap-base lubricants such as calcium stearate, fatty acid derivative-base lubricants such as fatty acid amides, and the like.

The "polypropylene etc." free from a lubricant is further preferably a "polypropylene etc." free from any additive generating gases at a temperature of 120° C. or lower. Examples of the additives generating gases at 120° C. or lower include antioxidants such as phenol substitution products and aromatic amines, various stabilizing agents such as ultraviolet absorbers exemplified by hindered amine-base products and benzophenone-base products, plasticizers such as phthalic acid ester typified by DOP (dioctyl phthalate), flame retardants which comprise a halogen-base flame retardant, antimony oxide or a phosphorus-base flame retardant each alone or in combination of at least two species among them.

In addition, the "polypropylene etc.", even if containing a lubricant, can be heat treated for gas removal. Therefore when the "polypropylene etc." which has been heat treated (C3) is blended in the thermoplastic elastomer composition, no gas is generated even under an environment of 40 to 50° C. {thermoplastic elastomer composition (III)}. The heat treatment of the "polypropylene etc." can be put into practice prior to the shaping into the form of gasket at a temperature of 80 to 150° C., preferably 100 to 130° C., for 1 to 48 hours, preferably 5 to 24 hours.

The blending amounts of the above described components (c2) and (c3) are each 1 to 100 parts by weight, preferably 3 to 40 parts by weight, particularly preferably 5 to 30 parts by weight based on 100 parts by weight of said component (a). A blending amount thereof, when exceeding 100 parts by weight based thereon, results in excessively high hardness of the thermoplastic elastomer composition (II) or (III), thereby deteriorating the sealing properties thereof.

The component (c4) in the thermoplastic elastomer composition (IV) according to the present invention is propylene homopolymer and/or propylene copolymer comprising propylene as a principal component each free from a lubricant. The propylene polymer comprising propylene as a principal component is exemplified by the copolymer of propylene and a small amount of an other α-olefin such as propylene/ethylene copolymer and propylene/4-methyl-1-pentene copolymer.

The polypropylene relating to the thermoplastic elastomer composition (IV) according to the present invention is not the polypropylene produced through polymerization by using a metallocene catalyst, but is conventional polypropylene specifically exemplified by isotactic polypropylene and atactic polypropylene, for instance, polypropylene which is obtained by polymerizing propylene in the presence of, for instance, Ziegler catalyst (titanium base). A random copolymer among the aforesaid copolymers is obtained in the presence of a small amount of ethylene or an other α-olefin at the time of polymerization, while block copolymer is obtained by producing propylene homopolymer, and thereafter polymerizing ethylene in many cases.

Propylene homopolymer and/or propylene copolymer comprising propylene as a principal component ("polypropylene etc.") each having an-MFR as described hereinbefore of at most 20 g/10 minutes, preferably in the range of 0.1 to 10 g/10 minutes, does not generate a gas even under an environment of 40 to 50° C. Accordingly, even when a thermoplastic elastomer composition containing such "polypropylene etc." is used as a gasket in hard disc apparatuses for a long period of time, the performance of the disc is not impaired by volatile components in gaseous form.

The blending amount of the above described component (c4) is 1 to 100 parts by weight, preferably 3 to 40 parts by weight, particularly preferably 5 to 30 parts by weight based on 100 parts by weight of said component (a). A blending amount thereof, when exceeding 100 parts by weight based thereon, results in excessively high hardness of the thermoplastic elastomer composition (IV), thereby deteriorating the sealing properties thereof.

The processes for producing the thermoplastic elastomer compositions (I), (II), (III) and (IV), respectively are not specifically limited, but well known production processes are applicable thereto. For instance, any of said thermoplastic elastomer compositions is readily producible by a process which comprises the steps of melt kneading the foregoing components and the additives that are used as desired by the use of a heating kneader such as a single screw extruder, a twin single screw extruder, a roll, a Banury mixer, a prabender, kneader or high shear type mixer; further adding as desired to the resultant mixture, a cross-linking agent such as an organic peroxide, cross-linking aid or the like, or simultaneously mixing with the necessary components; and melt kneading the resultant mixture.

The thermoplastic elastomer composition can also be produced by preparing preliminary thermoplastic elastomer composition (I), (II), (III) and (IV) which is produced by kneading a high molecular organic material and a softening agent, and further mixing the resultant composition with at least one high molecular organic material which is similar to or different from that to be used herein.

The thermoplastic elastomer composition according to the present invention is excellent in sealing properties and besides, can prevent the generation of gases containing volatile low molecular compounds even when used for a long period of time. Moreover, said thermoplastic elastomer, which hardly generates a volatile gas to a magnetic disc and the like under the service conditions of electronic equipment, is well suited for use in gasket materials, particularly gasket materials for a hard disc, and is widely applicable to the production of sealing materials, vibration insulators, shock-absorbing materials, covering materials and cushioning materials and the like.

A thermoplastic elastomer material can be produced by injection molding the thermoplastic elastomer composition produced in the above described manner. In the injection molding method of the present invention, there are used fine particulates of ultrahigh molecular weight polyethylene as dusting powders for the purpose of preventing agglomerating adhesion of pellets with one another at the time of feeding the pellets. Preferably, the ultrahigh molecular weight polyethylene has a molecular weight of at least 1,000,000 and a particle diameter of 50 $\mu$m or smaller.

In the case where said fine particulates of polyethylene are used, it is made possible to markedly decrease volatile components or contaminating components that are generated from moldings and harmful for precision equipment as compared with the case where conventional dusting powders are used, because of smaller amounts of low molecular weight components due to such ultrahigh molecular weight than those of conventional polyethylene. Moreover, the the ultrahigh molecular weight polyethylene to be used in the present invention, is not encompassed in the matrix thereof by being molten at the time of molding step; tends to segregate on the surface of the moldings, thus leading to improvement in sliding properties on the surface thereof; and reduces interference with and adhesion to external object even when being formed in the outside of structures, thereby eliminating the problem of the handling of the structures.

The thermoplastic elastomer material according to the present invention may be incorporated as desired with any of an antioxidant (age resister), a ultraviolet absorber, a light stabilizer and a variety of fillers to the extent that the objects of the present invention are not impaired thereby.

In the injection molding method according to the present invention, since there are used fine particulates of ultrahigh molecular weight polyethylene as dusting powders for the purpose of preventing agglomerating adhesion of pellets with one another, the resultant moldings of the thermoplastic elastomer is made excellent in sealing properties and sliding properties on the surface thereof, and can prevent generation of various gases at the time of use. Therefore, the injection molding method according to the present invention can favorably applied to the injection molding of precision equipment members such as gasket material and the like for hard disc apparatuses particular.

The external anti-sticking agent according to the present invention comprises fine particulates of ultrahigh molecular weight polyethylene having a molecular weight of at least 1,000,000 and a particle diameter of 500 $\mu$m or smaller, and exhibits the working effects as described hereunder owing to its being particulate.: ① a member which is composed of rubber or a thermoplastic elastomer and is coated with said anti-sticking agent can readily be fitted to an electrical product or the like, since the agent rolls against frictional force; ② a member which is composed of rubber or a thermoplastic elastomer and is coated with said anti-sticking agent is enhanced in vibration isolation effect, since the agent functions as a miniaturized bearing because of its ease of rolling.

The fine particulates of ultrahigh molecular weight polyethylene in said external anti-sticking agent has an average particle diameter of 500 $\mu$m or smaller, preferably 100 $\mu$m or smaller, particularly preferably 50 $\mu$m or smaller from the viewpoint of anti-sticking performance. In addition, from the viewpoint of heat resistance, the fine particulates thereof has a melting temperature or softening temperature of preferably 40° C. or higher, particularly preferably 100° C. or higher. Further from the standpoint of abrasion resistance, the fine particulates thereof have a SHORE-D hardness as measured according to ASTM D 2240 of preferably 40 degrees or higher, particularly preferably 60 degrees higher.

The reasons for the suitability of the fine particulates of ultrahigh molecular weight polyethylene for an external anti-sticking agent are that said particulates satisfy the requirements as described hereunder: ① long-term stability up to an elevated temperature of approximately 100° C.; ② electric stability without causing defective contact; ③ due to low oil absorption, low molecular components are less apt to migrate from rubber or the thermoplastic elastomer which is the object of anti-stickiness, thus maintaining a long-term anti-sticking performance; ④ due to non-hygroscopicity, the anti-sticking performance is less influenced by moisture in the air; ⑤ being applicable to precision equipment due to minimized gas generation at an elevated temperature; ⑥ being excellent in abrasion resistance and less prone to be deteriorated in anti-sticking performance even subjected to long-term friction after application to a product; ⑦ being less prone to cause allergy, thus hardly affecting a living body; ⑧ being distinguishable from uncoated article even when coated in a slight amount because of their whiteness.

The amount of the external anti-sticking agent to be used in the present invention depends upon the diameter of fine particulates of ultrahigh molecular weight polyethylene and the surface conditions of an object of anti-stickiness. It is at most 5 gram per 1 m² of the surface area of the object of anti-stickiness, thus exerting the anti-sticking effect in a minimized amount as compared with a conventional external anti-sticking agent.

There are a variety of objects of anti-stickiness, which are exemplified by a product, a molding and pellet that are made of rubber, and a semi-product and a raw material of rubber. The product, molding and pellet that are made of rubber are each usually constituted of any of a variety of rubber compositions. The rubber compositions are exemplified by a composition comprising 100 parts by weight of base ruber such as natural rubber, silicone rubber, butadiene rubber, isoprene rubber, chloroprene rubber, styrene/butadiene rubber, ethylene/propylene rubber, polynorbornene rubber, styrene/butadiene /styrene rubber and epichlorohydrin rubber and 100 to 300 parts by weight of a softening agent as described hereinafter.

Examples of other suitable objects of anti-stickiness include a product, a molding and pellet that are made of a thermoplastic elastomer, and a semi-product and a raw material of a thermoplastic elastomer. The product, molding and pellet that are made of a thermoplastic elastomer are each usually constituted of any of a variety of thermoplastic elastomer compositions. The thermoplastic elastomer compositions are exemplified by a composition comprising 100 parts by weight of (a) a hydrogenated block copolymer which is obtained by hydrogenating the block copolymer which comprises at least one polymer block composed principally of a vinylic aromatic compound and at least one polymer block composed principally of a conjugated diene compound, and which has a number-average molecular weight of 100,000 to 400,000:50 to 1,000 parts by weight of (b) a non-aromatic softening agent for rubber having a kinematic viscosity at 40° C. of at least 100 mm$^2$/sec; and 1 to 100 parts by weight of (c') a polyolefinic hydrocarbon base-resin composed principally of polypropylene. The external anti-sticking agent according to the present invention exhibits the working effect in particular, when being applied to the surface of an object of anti-stickiness composed of such thermoplastic elastomer.

The components (a) and (b) in the present invention are each exemplified by the component same as that has been described hereinbefore. The blending amount of the softening agent as the component (b) is in the range of 50 to 1000 parts by weight, preferably 55 to 300 parts by weight based on 100 parts by weight of the component (a). A blending amount of the component (b), when being less than 1 part by weight based thereon, brings about a fear of causing failure to achieve sufficient hardness lowering, thus leading to insufficient softness or flexibility of the resultant thermoplastic elastomer composition, whereas said amount, when being more than 3000 parts by weight based thereon, causes the softening agent to become more prone to bleed out and at the same time, decrease in the mechanical strength of the resultant thermoplastic elastomer composition. Preferably, the blending amount of the softening agent is properly selected in accordance with the molecular weight of the hydrogenated block copolymer as the component (a) and the types of other components that are added thereto.

In the aforesaid thermoplastic elastomer compositions according to the present invention, the polyolefinic hydrocarbon base-resin composed principally of polypropylene as the component (c') is added in order to improve the processability and heat resistant characteristics of the composition. Said resin is exemplified by isotactic polypropylene, the copolymer of propylene and a small amount of an other α-olefin such as propylene/ethylene copolymer and propylene/4-methyl-1-pentene copolymer. In the case of using isotactic polypropylene as the polyolefinic resin, there is preferably usable said resin having a MFR (melt flow rate as measured in accordance with JIS K 7210) in the range of 0.1 to 100 g/10 minutes , particularly 0.5 to 50 g/10 minutes. The component (c') is specifically exemplified by the component (c).

The blending amount of the component (c') is in the range of 1 to 100 parts by weight, preferably 1 to 50 parts by weight, particularly preferably 5 to 20 parts by weight based on 100 parts by weight of the component (a). A blending amount of the component (c'), when being more than 100 parts by weight based thereon, unfavorably brings about the thermoplastic elastomer composition having an excessively high hardness.

In the above mentioned thermoplastic elastomer composition according to the present invention, polystyrene resin may be used in combination therewith in order to improve the processability and heat resistant characteristics of the composition. Further in order to improve the compression set of the composition, polyphenylene ether resin may be blended as desired therein. In addition, the composition may be incorporated with a filler and a variety of additives.

A method for incorporating the external anti-sticking agent according to the present invention in an object of anti-stickiness such as a product comprising rubber or a thermoplastic elastomer may be any method, provided that the method is capable of sticking said agent to the surface of the object of anti-stickiness or covering said surface with said agent. There is exemplified, as a suitable method, a method in which said external anti-sticking agent is applied over the surface of said object by mechanically mixing them by means of a tumbler, a method in which said agent is manually applied to said object.

The product which is constituted of rubber or a thermoplastic elastomer, and is incorporated with the external anti-sticking agent according to the present invention, is exemplified by CD-ROM insulators. In the case where a CD-ROM insulator is coated with the external anti-sticking agent according to the present invention, there is exhibited a working effect in that thin-spot and/or adhesion is prevented during product shipment, use by a computer manufacturer, and use by end users. Moreover, in the case where gaskets for hard disc apparatuses are produced from pellets of a thermoplastic elastomer, the pellets are prevented from sticking to one another to form blocks by coating the pellets with the external anti-sticking agent according to the present invention.

The external anti-sticking agent of the present invention is particularly preferably used for the anti-stickiness of a thermoplastic elastomer which has a low hardness and contains a large amount of oil, and exerts marked anti-sticking effect in the case of a thermoplastic elastomer which has a MFR (melt flow rate) at a temperature of 230° C. of at least 10 g/10 minutes as measured in accordance with JIS K7210, or which has a compression set at 70° C. of at most 50% as measured in accordance with JIS K6301.

To summarize the working effects of the external anti-sticking agent according to the present invention, it is minimized in hygroscopicity, oil absorptivity and volatility, excellent in heat resistance, exerts working effect on the anti-stickiness of rubber and thermoplastic elastomers at an extremely small amount of use, and is particularly preferably usable for the anti-stickiness of a thermoplastic elastomer which has a low hardness and contains a large amount of oil. In addition, rubber and a thermoplastic elastomer each being incorporated with the external anti-sticking agent according to the present invention are excellent in anti-stickiness and easy in handling.

In what follows, the present invention will be described in further detail with reference to comparative examples and working examples, which however shall never limit the present invention thereto.

EXAMPLE 1

By the use of a twin screw extruder, the blending components as shown hereunder were kneaded at 220° C., and extruded into strands, which were then cut into pellets.

<Blending Components>

(1) styrene-ethylene/propylene-styrene triblock copolymer (manufactured by Kuraray Co., Ltd. under the trade name "Septon" having a number-average molecular weight of 120,000 and styrene moiety content of 30% by weight); 100 parts by weight (2) paraffin-base oil having a kinematic viscosity at 40° C. of 380 mm$^2$/sec (manufactured by Idemitsu Koasan Co., Ltd. under the trade name "Diana Process Oil PW 380" having a weight average molecular weight of 750); 100 parts by weight (3) polypropylene produced through a metallocene catalyst (manufactured by Exxon Chemical Co., Ltd. under the trade name "Achieve" Mw/Mn:2.0); 25 parts by weight.

Thereafter, by the use of an injection molding machine (manufactured by Nissei Plastic Industrial Co., Ltd. under the trade name "DC 60E5ASE"), the above prepared thermoplastic elastomer material was subjected to melt injection molding at a molding temperature of 180° C. to prepare sheets each having a thickness of 1 mm. The resultant sheets were cut into small pieces each weighing 0.1 gram, which were preserved in a sample tube of a thermal desorption cold trap unit, and then were heated at 100° C. for 30 minutes. The gases generated during the heating in a stream of He purge gas at a flow rate of 10 ml/minute were captured in the trap portion chilled to minus 130° C. Thereafter the trap portion was rapidly heated to 150° C., and a measurement was made of the released gases by GC-MS with the use of a secondary electron multiplier equipped with a post acceleration detector and an atomic emission detector.

As a result of the measurement, the generated gases were confirmed to be saturated hydrocarbons in extremely slight amounts.

EXAMPLE 2

By the use of a twin screw extruder, the blending components as shown hereunder were kneaded at 220° C., and extruded into strands, which were then cut into pellets.

<Blending Components>
(1) styrene-ethylene/propylene-styrene triblock copolymer having a number-average molecular weight of 50,000 and styrene moiety content of 30% by weight; 100 parts by weight
(2) paraffin-base oil having a kinematic viscosity at 40° C. of 380 mm$^2$/sec (manufactured by Idemitsu Roasan Co., Ltd. under the trade name "Diana Process Oil PW 380" having a weight average molecular weight of 750); 125 parts by weight
(3) polypropylene produced through a metallocene catalyst (manufactured by Exxon Chemical Co., Ltd. under the trade name "Achieve" Mw/Mn:2.0); 30 parts by weight Thereafter, the procedure in Example 1 was repeated to prepare sheets, make samples from the sheets, and measure the released gases. As a result of the measurement, the generated gases proved to be saturated hydrocarbons in extremely slight amounts.

EXAMPLE 3

Figure 1:
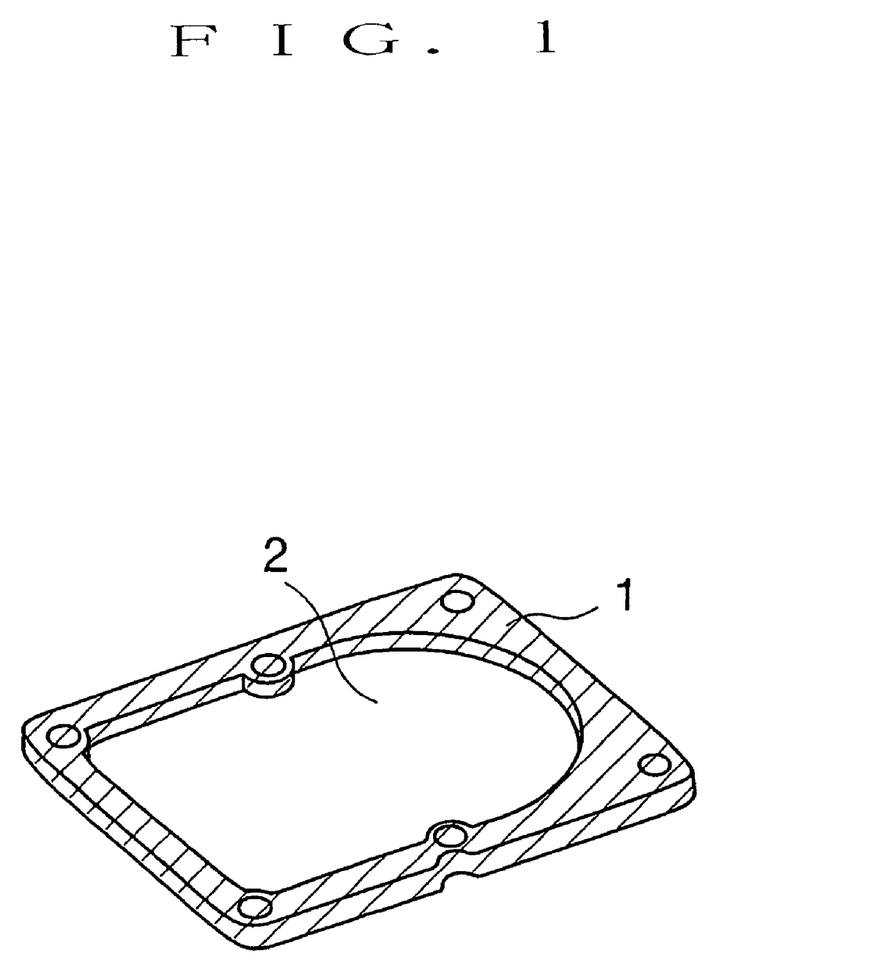
FIG. 1 is a perspective illustration which shows one embodiment of gasket according to the present invention.

By carrying out injection molding in the same manner as in Example 1, there was produced a gasket fitted to a cover for a case housing a hard disc driving unit as illustrated in FIG. 1 viewed from the sealing surface side. In FIG. 1 the gasket 1 was tightly stuck to the surface of the cover 2 made of aluminum, and the cover 2 constituted a cover for the case housing the hard disc driving unit. In the central space portion of the gasket fitted to the cover, such apparatuses as a magnetic disc, a magnetic head and an actuator were placed on the box body side of the case for housing the hard disc driving unit. These apparatuses were closed with a box body made of a metal (not shown on the figure) and the gasket fitted to the cover, and were accommodated in the case for housing the hard disc driving unit. The above mentioned description on the gasket fitted to the cover shall apply to the examples hereinafter disclosed.

The aforesaid gasket fitted to the cover was brought into use as the cover for the case for housing the hard disc driving unit, that is, the gasket was arranged in the hard disc driving unit. As a result, over a long period of time there was no occurrence of failure or trouble considered to be due to a gas generated from said gasket.

EXAMPLE 4

By the use of a twin screw extruder, the blending components as shown hereunder were kneaded at 220° C., and extruded into strands, which were then cut into pellets.

<Blending Components>
(1) styrene-ethylene/propylene-styrene triblock copolymer (manufactured by Kuraray Co., Ltd. under the trade name "Septon" having a number-average molecular weight of 120,000 and styrene moiety content of 30% by weight); 100 parts by weight
(2) paraffin-base oil having a kinematic viscosity at 40° C. of 380 mm$^2$/sec (manufactured by Idemitsu Koasan Co., Ltd. under the trade name "Diana Process Oil PW 380" having a weight average molecular weight of 750); 100 parts by weight
(3) polypropylene free from a lubricant (manufactured by Chisso Corporation under the trade name "CF 3001"); 25 parts by weight.

Thereafter, by the use of an injection molding machine (manufactured by Nissei Plastic Industrial Co., Ltd. under the trade name "DC 60E5ASE"), the above prepared thermoplastic elastomer material was subjected to melt injection molding at a molding temperature of 180° C. to prepare sheets each having a thickness of 1 mm. The resultant sheets were cut into small pieces each weighing 0.1 gram, which were preserved in a sample tube of a thermal desorption cold trap unit, and then were heated at 100° C. for 30 minutes. The gases generated during the heating in a stream of He purge gas at a flow rate of 10 ml/minute were captured in the trap portion chilled to minus 130° C. Thereafter the trap portion was rapidly heated to 150° C., and a measurement was made of the released gases by GC-MS with the use of a secondary electron multiplier equipped with a post acceleration detector and an atomic emission detector.

As a result of the measurement, the generated gases were confirmed to be saturated hydrocarbons in extremely slight amounts.

COMPARATIVE EXAMPLE 1

The procedure in Example 4 was repeated to prepare samples, and measure the released gases except that there was used polypropylene which contained a metallic soap salt-base lubricant (manufactured by Japan Polychem Co., Ltd. under the trade name "EX 6") in place of the polypropylene as used in Example 4. As a result of the measurement, the generated gases proved to be saturated hydrocarbons in amounts approximately 40 times those in Example 4.

EXAMPLE 5

By the use of a twin screw extruder, the blending components as shown hereunder were kneaded at 220° C., and extruded into strands, which were then cut into pellets.

<Blending Components>
(1) styrene-ethylene/propylene-styrene triblock copolymer having a number-average molecular weight of 50,000 and styrene moiety content of 30% by weight; 100 parts by weight
(2) paraffin-base oil having a kinematic viscosity at 40° C. of 380 mm$^2$/sec (manufactured by Idemitsu Koasan Co., Ltd. under the trade name "Diana Process Oil PW 380" having a weight average molecular weight of 750); 125 parts by weight
(3) polypropylene free from a lubricant (manufactured by Chisso Corporation under the trade name "CF 3001"); 30 parts by weight Thereafter, the procedure in Example 4 was repeated to prepare sheet, make samples from the sheets, and measure the released gases. As a result of the measurement, the generated gases proved to be saturated hydrocarbons in amounts approximately 1/20 (one-twentieth) of those in Comparative Example 1.

EXAMPLE 6

By carrying out injection molding in the same manner as in Example 4, there was produced a gasket fitted to a cover for a case housing a hard disc driving unit as illustrated in FIG. 1. The aforesaid gasket fitted to the cover was brought into use as the cover for the case housing the hard disc driving unit, that is, the gasket was arranged in the hard disc driving unit. As a result, over a long period of time there was no occurrence of failure or trouble considered to be due to a gas generated from said gasket.

EXAMPLE 7

By the use of a twin screw extruder, the blending components as shown hereunder were kneaded at 220° C., and extruded into strands, which were then cut into pellets.

<Blending Components>
(1) styrene-ethylene/propylene-styrene triblock copolymer (manufactured by Kuraray Co., Ltd. under the trade name "Septon" having a number-average molecular weight of 120,000 and styrene moiety content of 30% by weight); 100 parts by weight
(2) paraffin-base oil having a kinematic viscosity at 40° C. of 380 mm$^2$/sec (manufactured by Idemitsu Koasan Co., Ltd. under the trade name "Diana Process Oil PW 380" having a weight average molecular weight of 750); 100 parts by weight
(3) polypropylene containing calcium stearate (manufactured by Japan Polychem Co., Ltd. under the trade name "MA 03") which had been heat treated in an oven at 110° C. for 24 hours; 25 parts by weight Thereafter, by the use of an injection molding machine (manufactured by Nissei Plastic Industrial Co., Ltd. under the trade name "DC 60E5ASE"), the above prepared thermoplastic elastomer material was subjected to melt injection molding at a molding temperature of 180° C. to prepare sheets each having a thickness of 1 mm. The resultant sheets were cut into small pieces each weighing 0.1 gram and were preserved in a sample tube of a thermal desorption cold trap unit, and then were heated at 100° C. for 30 minutes. The gases generated during the heating in a stream of He purge gas at a flow rate of 10 ml/minute were captured in the trap portion chilled to minus 130° C. Thereafter the trap portion was was rapidly heated to 150° C., and a measurement was made of the released gases by GC-MS with the use of a secondary electron multiplier equipped with a post acceleration detector and an atomic emission detector.

As a result of the measurement, the generated gases were confirmed to be saturated hydrocarbons in extremely slight amounts.

COMPARATIVE EXAMPLE 2

The procedure in Example 7 was repeated to prepare samples, and measure the released gases except that polypropylene containing calcium stearate was used without carrying out heat treatment. As a result of the measurement, the generated gases proved to be saturated hydrocarbons in amounts approximately 40 times those in Example 7.

EXAMPLE 8

By the use of a twin screw extruder, the blending components as shown hereunder were kneaded at 220° C., and extruded into strands, which were then cut into pellets.

<Blending Components>
(1) styrene-ethylene/propylene-styrene triblock copolymer having a number-average molecular weight of 50,000 and styrene moiety content of 30% by weight; 100 parts by weight
(2) paraffin-base oil having a kinematic viscosity at 40° C. of 380 mm$^2$/sec (manufactured by Idemitsu Koasan Co., Ltd. under the trade name "Diana Process Oil PW 380" having a weight average molecular weight of 750); 125 parts by weight
(3) polypropylene containing calcium stearate (manufactured by Japan Polychem Co., Ltd. under the trade name "MA 03") which had been heat treated in an oven at 110° C. for 24 hours; 30 parts by weight Thereafter, the procedure in Example 4 was repeated to prepare sheets, make samples from the sheets, and measure the released gases. As a result of the measurement, the generated gases proved to be saturated hydrocarbons in amounts approximately 1/20 (one-twentieth) of those in Comparative Example 1.

EXAMPLE 9

By carrying out injection molding in the same manner as in Example 7, there was produced a gasket which was same as that in Example 6 and was fitted to a cover for a case housing a hard disc driving unit. The aforesaid gasket fitted to the cover was brought into use as the cover for the case housing the hard disc driving unit, that is, the gasket was arranged in the hard disc driving unit. As a result, over a long period of time there was no occurrence of failure or trouble considered to be due to a gas generated from said gasket.

EXAMPLE 10

By the use of a twin screw extruder, the blending components as shown hereunder were kneaded at 220° C., and extruded into strands, which were then cut into pellets.

<Blending Components>
(1) styrene-ethylene/propylene-styrene triblock copolymer (manufactured by Kuraray Co., Ltd. under the trade name "Septon" having a number-average molecular weight of 120,000 and styrene moiety content of 30% by weight); 100 parts by weight
(2) paraffin-base oil having a kinematic viscosity at 40° C. of 380 mm$^2$/sec (manufactured by Idemitsu Koasan Co., Ltd. under the trade name "Diana Process Oil PW 380" having a weight average molecular weight of 750); 100 parts by weight
(3) polypropylene which had an MFR at a temperature of 230° C. and a load of 2.16 kgf of 13 g/10 minutes (manufactured by Sumitomo Chemical Co., Ltd. under the trade name "Nohprene X101"); 25 parts by weight Thereafter, by the use of an injection molding machine (manufactured by Nissei Plastic Industrial Co., Ltd. under the trade name "DC 60E5ASE"), the above prepared thermoplastic elastomer material was subjected to melt injection molding at a molding temperature of 180° C. to prepare sheets each having a thickness of 1 mm. The resultant sheets were cut into small pieces each weighing 0.1 gram and were preserved in a sample tube of a thermal desorption cold trap unit, and then were heated at 100° C. for 30 minutes. The gases generated during the heating in a stream of He purge gas at a flow rate of 10 ml/minute were captured in the trap portion chilled to minus 130° C. Thereafter the trap portion was rapidly heated to 150° C., and a measurement was made of the released gases by GC-MS with the use of a secondary electron multiplier equipped with a post acceleration detector and an atomic emission detector.

As a result of the measurement, the generated gases were confirmed to be saturated hydrocarbons in extremely slight amounts.

COMPARATIVE EXAMPLE 3

The procedure in Example 10 was repeated to prepare samples, and measure the released gases except that there was used polypropylene which had an MFR at a temperature of 230° C. and a load of 2.16 kgf of 40 g/10 minutes (manufactured by Sumitomo Chemical Co., Ltd. under the trade name "Nohprene X101A") in place of the polypropylene as used in Example 10. As a result of the measurement, the generated gases proved to be saturated hydrocarbons in amounts approximately 40 times those in Example 10.

EXAMPLE 11

By the use of a twin screw extruder, the blending components as shown hereunder were kneaded at 220° C., and extruded into strands, which were then cut into pellets.
<Blending Components>
(1) styrene-ethylene/propylene-styrene triblock copolymer having a number-average molecular weight of 50,000 and styrene moiety content of 30% by weight; 100 parts by weight
(2) paraffin-base oil having a kinematic viscosity at 40° of 380 mm$^2$/sec (manufactured by Idemitsu Koasan Co., Ltd. under the trade name "Diana Process Oil PW 380" having a weight average molecular weight of 750); 125 parts by weight
(3) polypropylene which had an MFR at a temperature of 230° C. and a load of 2.16 kgf of 13 g/10 minutes (manufactured by Sumitomo Chemical Co., Ltd. under the trade name "Nohprene x101"); 30 parts by weight Thereafter, the procedure in Example 10 was repeated to prepare sheets, make samples from the sheets, and measure the released gases. As a result of the measurement, the generated gases proved to be saturated hydrocarbons in amounts approximately ¹⁄₂₀ (one-twentieth) of those in Comparative Example 3.

EXAMPLE 12

By carrying out injection molding in the same manner as in Example 10, there was produced a gasket fitted to a cover for a case housing a hard disc driving unit as illustrated in FIG. 1. The aforesaid gasket fitted to the cover was brought into use as the cover for the case housing the hard disc driving unit, that is, the gasket was arranged in the hard disc driving unit. As a result, over a long period of time there was no occurrence of failure or trouble considered to be due to a gas generated from said gasket.

EXAMPLE 13

By the use of a twin screw extruder, the blending components as shown hereunder were kneaded at 220° C., and extruded into strands, which were then cut into pellets.
<Blending Components>
(1) styrene-ethylene/propylene-styrene triblock copolymer manufactured by Kuraray Co., Ltd. under the trade name "Septon" having a number-average molecular weight of 120,000 and styrene moiety content of 30% by weight); 100 parts by weight
(2) paraffin-base oil having a kinematic viscosity at 40° C. of 380 mm$^2$/sec (manufactured by Idemitsu Koasan Co., Ltd. under the trade name "Diana Process Oil PW 380" having a weight average molecular weight of 750); 110 parts by weight
(3) polypropylene produced through a metallocene catalyst (manufactured by Exxon Chemical Co., Ltd. under the trade name "Achieve" Mw/Mn:2.0); 15 parts by weight Thereafter, 100 parts by weight of the pellets thus obtained were almost uniformly coated with, as the dusting powders, 1.5 part by weight of ultrahigh molecular weight polyethylene which had an average particle diameter of 26 μm a melting point of 136° C. and a SHORE-D hardness of 40 degrees. Thereafter, by the use of an injection molding machine (manufactured by Nissei Plastic Industrial Co., Ltd. under the trade name "DC 60E5ASE"), the above coated thermoplastic elastomer material was subjected to melt injection molding to prepare sheets each having a thickness of 1 mm. As a result, the sheets had favorable releaseablity from the mold and free from sticking to one another.

Further, in order to test the possibility of causing contamination due to gases generated from the sheets, 5 cm square sheets were cut therefrom, placed in a hermetically sealed container made of glass in the presence of a copper piece, and allowed to stand at 100° C. for 300 hours, followed by the observation of the copper piece. As a result, no abnormality such as clouding on the copper piece was observed.

COMPARATIVE EXAMPLE 4

The procedure in Example 13 was repeated to prepare samples of sheets through injection molding method except that there was used, as the dusting powders, polyolefin-base mixed wax having an average particle diameter of 10 μm in an amount of 1.5 part by weight based on 100 parts by weight of the pellets. The resultant sheets showed a feeling of stickiness with one another.

Also, in order to test the possibility of causing contamination due to gases generated from the sheet, 5 cm square sheets were cut therefrom, and were subjected to the test same as in Example 13. As a result, clouding on the copper piece was observed. It was confirmed by analysis that the clouding components were identical with those generated from the polyolefin-base mixed wax used as the dusting powders.

EXAMPLE 14

By carrying out injection molding in the same manner as in Example 10, there was produced a gasket fitted to a cover for a case housing a hard disc driving unit as illustrated in FIG. 1. There was repeated the work of fitting the aforesaid gasket fitted to the cover into the preliminarily arranged case for housing the hard disc driving unit. In the course of the repeated the work, the sliding properties of the gasket material were satisfactory without causing at all any concern about defective sealing properties due to upturning or curling even when the gasket portion which was exposed on the surface of the cover came into contact with other portions. As a result of a long-term use of the hard disc driving unit, there was no occurrence of failure or trouble considered to be due to a gas or a volatile component generated from said gasket.

Evaluations on anti-stickiness in the following Examples 15 & 16 and Comparative Examples 5 & 6 were carried out according to the procedures as described hereunder. Evaluations on anti-stickiness [A]: Objects of anti-stickiness to be evaluated on anti-stickiness were coated with an external anti-sticking agent, and were allowed to stand in a thermostat at a temperature of 70° C. for 200 hours to prepare test pieces. Two test pieces that were coated with the same external anti-sticking agent were superimposed, and one of them was lifted up at an end thereof to evaluate whether or not one of the two test pieces was separated from the other without being stuck. Thus, immediately separated case was marked with ○, and other case with X. Evaluations on anti-stickiness [B]: Objects of anti-stickiness to be evaluated on anti-stickiness were coated with an external anti-sticking agent, and were allowed to stand in a thermostat at a temperature of 40° C. and a relative humidity of 95% for 200 hours to prepare test pieces. Two test pieces that were coated with the same external anti-sticking agent were superimposed, and one of them was lifted up at an end thereof to evaluate whether or not one of the two test pieces was separated from the other without being stuck. Thus, immediately separated case was marked with ○, and other case with X.

EXAMPLES 15 & 16 AND COMPARATIVE EXAMPLES 5 & 6

Injection molded sheets each measuring 10 cm×10 cm in side dimension and 2 mm in thickness were prepared by injection molding the thermoplastic elastomer composition which consisted of 100 parts by weight of styrenic elastomer (manufactured by Asahi Chemical Industries Co., Ltd. under the trade name "Tufftec H127" having a number average molecular weight of 140,000; 100 parts by weight of paraffin-base oil having a kinematic viscosity at 40° C. of 380 $mm^2$/sec (manufactured by Idemitsu Koasan Co., Ltd. under the trade name "Diana Process Oil PW 380" having a weight average molecular weight of 750); and 12.5 parts by weight of polypropylene (manufactured by Japan Polychem Industries Ltd. under the trade name "Novatic PP·BC05B"). The moldings thus obtained were subjected to the evaluation test on anti-stickiness as described hereinbefore.

The external anti-sticking agent which was used in the evaluation test on anti-stickiness was: powdery polyolefin comprising ultrahigh molecular weight polyethylene (manufactured by Mitsui Chemical Industries Co., Ltd. under the trade name "Mipelon XM220" having an average particle diameter of 30 μm, a melting point of 136° C. and a SHORE-D hardness of 65 degrees for Example 15; powdery polyolefin comprising ultrahigh molecular weight polyethylene (manufactured by Mitsui Chemical Industries Co., Ltd. under the trade name "Mipelon XM220U" having an average particle diameter of 25 μm, a melting point of 136° C. and a SHORE-D hardness of 65 degrees for Example 16; fine particulate magnesium silicate for Comparative Example 5; and flaky mica powder for Comparative Example 6. The results of evaluation are given in Table 1.

TABLE 1

|  | Example 1 | Example 2 | Comp. Example 5 | Comp. Example 6 |
|---|---|---|---|---|
| Evaluations on anti-stickiness [A] | ○ | ○ | x | x |
| Evaluations on anti-stickiness [B] | ○ | ○ | x | x |

{Remarks} Comp.: Comparative

What is claimed is:
1. A thermoplastic elastomer composition consisting essentially of:
   (a) 100 parts by weight of a hydrogenated block copolymer produced by hydrogenating a block copolymer comprising at least one polymer block composed of a vinyl aromatic compound as a principal component and at least one polymer block composed of a conjugated diene compound as a principal component;
   (b) 50 to 1000 parts by weight of a non-aromatic base softening agent having a kinematic viscosity of at least 100 $mm^2$/sec at 40° C.; and
   (c) 1 to 100 parts by weight of a propylene homopolymer and/or a propylene copolymer comprising propylene as a principal component, each of the propylene homopolymer and the propylene copolymer having been heat-treated to remove gas contained therein.

2. The thermoplastic elastomer composition according to claim 1, wherein the heat treatment is carried out at 80 to 150° C.

3. The thermoplastic elastomer composition according to claim 1, wherein the heat treatment is carried out at 100 to 130° C.

4. A gasket member which is made of a thermoplastic elastomer composition consisting essentially of:
   (a) 100 parts by weight a hydrogenated block copolymer produced by hydrogenating a block copolymer comprising at least one polymer block mainly composed of a vinyl aromatic compound and at least one polymer block mainly composed of a conjugated diene compound;
   (b) 50 to 1000 parts by weight of a non-aromatic base softening agent having a kinematic viscosity of at least 100 $mm^2$/sec at 40° C.; and
   (c) 1 to 100 parts by weight of a propylene homopolymer and/or a propylene copolymer comprising propylene as a principal component, each of the propylene homopolymer and the propylene copolymer being produced by a polymerization in the presence of a metallocene catalyst.

5. A gasket member which is made of a thermoplastic elastomer composition consisting essentially of
   (a) 100 parts by weight of a hydrogenated block copolymer produced by hydrogenating a block copolymer comprising at least one polymer block composed of a vinyl aromatic compound as a principal component and at least one polymer block composed of a conjugated diene compound as a principal component;
   (b) 50 to 1000 parts by weight of a non-aromatic base softening agent having a kinematic viscosity of at least 100 $mm^2$/sec at 40° C.; and
   (c) 1 to 100 parts by weight of a propylene homopolymer and/or a propylene copolymer comprising propylene as a principal component, each of the propylene homopolymer and the propylene copolymer having been heat-treated.

6. A gasket member which is made of a thermoplastic elastomer composition consisting essentially of:
   (a) 100 parts by weight of a hydrogenated block copolymer produced by hydrogenating a block copolymer comprising at least one polymer block composed of a vinyl aromatic compound as a principal component and at least one polymer block composed of a conjugated diene compound as a principal component;
   (b) 50 to 1000 parts by weight of a non-aromatic base softening agent having a kinematic viscosity of at least 100 $mm^2$/sec at 40° C.; and
   (c) 1 to 100 parts by weight of a propylene homopolymer and/or a propylene copolymer comprising propylene as a principal component, each of the propylene homopolymer and the propylene copolymer having a melt flow rate of at most 20 g/10 min when measured in accordance with JIS K 7210 at 230° C. under a load of 2.16 kgf.

7. The gasket member according to claim 6, wherein the melt flow rate is 0.1 to 10 g/10 min.

* * * * *

UNITED STATES PATENT AND TRADEMARK OFFICE
CERTIFICATE OF CORRECTION

PATENT NO. : 6,399,696 B1
DATED : June 4, 2002
INVENTOR(S) : Toyosawa et al.

It is certified that error appears in the above-identified patent and that said Letters Patent is hereby corrected as shown below:

<u>Title page,</u>
Item [75], should read: -- [75] Inventors: Shinichi Toyosawa, Saitama-Ken; Youichi Nishimuro, Tokyo; Kunio Machida, Tokyo; Takashi Shimizu, Tokyo, all of (JP) --

Signed and Sealed this

Twenty-ninth Day of October, 2002

*Attest:*

*Attesting Officer*

JAMES E. ROGAN
*Director of the United States Patent and Trademark Office*